(12) United States Patent
Ortega Collado

(10) Patent No.: US 9,586,804 B2
(45) Date of Patent: Mar. 7, 2017

(54) SECURITY TAP FOR LIQUID CONTAINERS

(71) Applicant: CONOTAINER, S.L., Madrid (ES)

(72) Inventor: Santos Ortega Collado, Madrid (ES)

(73) Assignee: SANTOS ORTEGA COLLADO, Madrid (ES)

( * ) Notice: Subject to any disclaimer, the term of this patent is extended or adjusted under 35 U.S.C. 154(b) by 34 days.

(21) Appl. No.: 14/824,371

(22) Filed: Aug. 12, 2015

(65) Prior Publication Data

US 2015/0344288 A1    Dec. 3, 2015

Related U.S. Application Data

(63) Continuation-in-part of application No. PCT/SE2013/000037, filed on Feb. 18, 2013.

(51) Int. Cl.
*B67D 3/04* (2006.01)
*B67D 3/00* (2006.01)
*E05B 67/38* (2006.01)

(52) U.S. Cl.
CPC ........... *B67D 3/043* (2013.01); *B67D 3/0067* (2013.01); *B67D 3/0074* (2013.01); *E05B 67/38* (2013.01)

(58) Field of Classification Search
CPC .... B67D 3/043; B67D 3/0074; B67D 3/0067; E05B 67/38
USPC ................. 222/153.01, 153.13, 153.14, 105
See application file for complete search history.

(56) References Cited

FOREIGN PATENT DOCUMENTS

| EP | 0432070 | 6/1991 | |
|---|---|---|---|
| EP | 1498359 | 1/2005 | |
| GB | 254862 | 7/1926 | |
| IT | WO 2006085347 A1 * | 8/2006 | ............... B67B 7/26 |
| WO | WO-9735802 | 10/1997 | |
| WO | WO-0229297 | 4/2002 | |

OTHER PUBLICATIONS

PCT Search Report and Written Opinion for PCT/ES2013/000037, mailed Oct. 30, 2013, with English translation, 17 pages.

* cited by examiner

*Primary Examiner* — Donnell Long
(74) *Attorney, Agent, or Firm* — Blakely Sokoloff Taylor & Zafman LLP

(57) ABSTRACT

The invention relates to containers commonly used for the sale of wine, including a tap essentially comprising a stationary body and a deformable elastic plug that tends to stay closed. According to the invention, transverse grooves are provided at one of the rear corners of each of the windows in which the flanges move and, by means of the angular rotation of the cylindrical cap, said grooves can be used to lock the flanges axially in the forced closed position, before and after removing the seal, thereby hindering the opening of the tap, which requires a combined rotation and pulling movement. In addition, the stationary and moving elements include coaxial through-holes allowing the installation of a padlock preventing unauthorized persons from accessing the container.

8 Claims, 5 Drawing Sheets

SECURITY TAP FOR LIQUID CONTAINERS

CROSS-REFERENCE TO RELATED APPLICATION

This application is a continuation-in-part of PCT Application No. PCT/ES2013/000037, filed Feb. 18, 2013, the disclosure of which is incorporated by reference.

DESCRIPTION

Object of the Invention

The present invention relates to a safety tap, which has been especially designed for containers for liquids, in particular of liquid food, and more specifically of wines, where the containers comprise a plastic bag, housed in a cardboard box, for acquiring due stability and protection.

Although, as has just been stated, the tap of the invention is especially devised for being used in containers for liquid food, it is also applicable to other industrial fields wherein the same or similar features are required, such as, for example, pharmacological liquids, liquids for industrial processes, etc.

The object of the invention is to provide a tap which offers maximum security against possible fortuitous openings, and even against unauthorized openings, and also improving isolation or barrier effect against the possible permeability to gases and environments of the materials forming it, also improving its ergonomics, features and usefulness.

BACKGROUND OF THE INVENTION

In the preferred field of practical application of the invention, that of wine packaging, "bag in box" containers have been used for a long time, which, as its name indicates, are formed by the combination of a bag manufactured in laminated-technique plastic materials, which constitutes a type of "wineskin" provided with a tap, where the bag is housed inside a cardboard box which gives adequate protection and stability to said bag and particularly to the bag's tap.

This type of container, compared with the classic bottling of wines in rigid containers of different types, entails considerable advantages. Both bottling and "bag in box" solutions have in common the need to be equipped with a closure which is sufficiently water-tight and impermeable to the entry of gases, including air, since wine (and other liquids) are especially sensitive to the contact with the gases after the bottle or bag in box have been open, since oxidation, or reaction with other undesirable substances that access the inside of the container, occurs. Therefore, the consumer often finds that the wine loses qualities with the passage of time, having to drink it quickly before it is ruined.

The bag has no greater requirements than the use of materials suitable for the level of the barrier effect one wants to obtain, whilst for the tap there are multiple structural and functional solutions, always attempting to lengthen the time the wine can remain in perfect condition inside the container to the greatest possible extent, as well as its water-tightness, ergonomics, security and other improved features.

Within the variety of existing taps, the one shown by Spanish patent ES 2 060 119 should be indicated, to the point that after its legal life having ended and having become public domain, it has been adopted by several tap manufacturers.

However, the tap of said European patent has certain problems that are fundamentally centered on the following aspects:

Although the tap is equipped with a seal which guarantees the authenticity of its content and the volume it contains, after the container is initially opened, i.e. once said seal is removed, the tap is at the mercy of mishandling, such as for example, actions of children, accidental openings, unauthorized consumption of its content, etc.

The closing pressure is usually directly related to the effort necessary to perform the manual opening of the tap, so that for a greater firmness of the closure and consequently a greater impermeability to oxygen, it is necessary to have greater opening force, with the consequent inconvenience this entails.

In the actuation of the tap, i.e. in the opening manoeuvre thereof for decanting the wine to a recipient vessel, such as, for example, a glass, the hand that acts on the tap conceals said glass from the user's view, so that, to control the level of liquid accessing the latter, an uncomfortable body position is also required, which it would be desirable to improve.

The permeability to oxygen of the tap body, or rather of the tap as whole, even being good, is also desirable to improve, since it directly intervenes in the maximum time that the wine can be maintained in the container in optimum conditions.

The possibility of eliminating the extended precaution that normally appears on the boxes of these containers, of giving a maximum period of consumption after eliminating the seal, which in general is less than 20% of the estimate considered before opening, is also very important. This precaution is due to the fact that, during opening, part of the pressure in the closure provided by the seal is eliminated from the tap assembly, with the logical consequence of increasing the possibilities of entry of air in the container, which also entails the loss of security in the content.

DESCRIPTION OF THE INVENTION

The safety tap for containers for liquid food proposed by the invention resolves the aforementioned problem in a fully satisfactory manner, in each and every one of the different aspects commented.

To do this, more specifically, and based on a general structure for the tap that is similar to that of the Spanish patent mentioned in the background section, the safety tap is designed to be preferably used in containers for liquids, in particular, in those comprising a plastic bag with a certain quantity of wine or other liquids sensitive to certain gases and environments; and a stabilizing box of cardboard or similar where the bag, as well as the tap connected to the bag, are housed, where the safety tap comprises:

a hollow base body, equipped with a first end, for being coupled to the bag, and a second end;

a sealing seat, incorporated in the base body, in the proximity of the first end of the base body;

an access orifice located in the sealing seat to allow the liquid to access from the bag to the tap;

a pouring spout to allow the liquid which has accessed the tap through the access orifice, to exit the tap;

windows made in the base body;

a bushing displaceable through the interior of the base body;

ribs, located at a first end of the bushing and protruding from the base body through the windows, and which can be actuated, to allow a user to displace the bushing, distancing the bushing from the sealing seat, from a closed position, wherein the liquid does not have access to the pouring spout, to an open position wherein the liquid has access to the pouring spout;

a deformable elastic element connected to the base body;

a plug located at a second end of the bushing, opposite the first end, and linked to the elastic element;

where, in the closed position, the elastic element is pressed by the effect of the plug against the sealing seat to close the pouring spout, and, in the closed position, the elastic element is configured to exert recovering force on the bushing; and grooves in the base body, in extension of the windows, to house the ribs in the closed position by axial rotation of the ribs and to block the axial displacement of the bushing, maintaining the closed position.

This entails that, after the initial opening of the container, the tap may adopt at all times a situation of safety lock, which prevents said tap from being open in its classic opening manoeuvre, since it is necessary to first perform a rotation of the ribs, which in itself means that the tap cannot be accidentally opened by children or people who do not know the manoeuvre, so that to perform the opening, the ribs are rotated with minimum effort, which is voluntary, in the sense that it requires knowing of the manoeuvre, and it is substantially independent of the force existing on the sealing seat. Next, and almost simultaneously, it can be instinctively opened.

On the other hand, the grooves act so that an overpressure is generated against the sealing seat which, due to deformation, substantially and progressively improves the closure situation, without increasing the effort necessary for its opening, improving its most important characteristics: safety, water-tightness and impermeability to gases, making it equal to the safety situation before the first opening.

According to another of the characteristics of the invention, the base body of the tap has been provided, far from its sealing seat for the plug, with a first safety orifice which, in combination with a second safety orifice in the bushing, allow a padlock to be mounted on the tap in closed situation, which traverses said orifices, and which makes it totally impossible for unauthorized persons to open it, i.e. persons that do not have the key to open said padlock or alphanumerical opening code.

Likewise, according to another of the characteristics of the invention, the elastically deformable part and the sealing seat of the base body adopt identical configuration in the closure area, specifically a practically semi-spherical configuration, so that in a closed position they determine a double wall, in close and complete contact which increases the oxygen permeability barrier effect, as in consequence it also achieves that the upper area of the body is free from content.

The existence, in the ribs of the plug, of respective flaps should also be indicated, that cover the windows of the body wherethrough said ribs run, which avoids that when the tap returns to its closed position it may nip the fingers of the user as happens with others.

Furthermore, the set of improvements described expand the possibilities of the container in terms of quality of the wine and other products to package, as it increases the level of efficacy and confidence of both the users and consumers, considering the advantage of the packaged products being maintained better and for a longer time, with the maximum security of use, consumption and with the same number of parts, which, as a whole, opens an important trend towards collecting, which also benefits the quality of the wine in that case.

DESCRIPTION OF THE DRAWINGS

To complement the description being made and in order to aid towards a better understanding of the characteristics of the invention, in accordance with a preferred example of practical embodiment thereof, a set of drawings is attached as an integral part of said description wherein, with illustrative and non-limiting character, the following has been represented.

PREFERRED EMBODIMENT OF THE INVENTION

Figure 1:
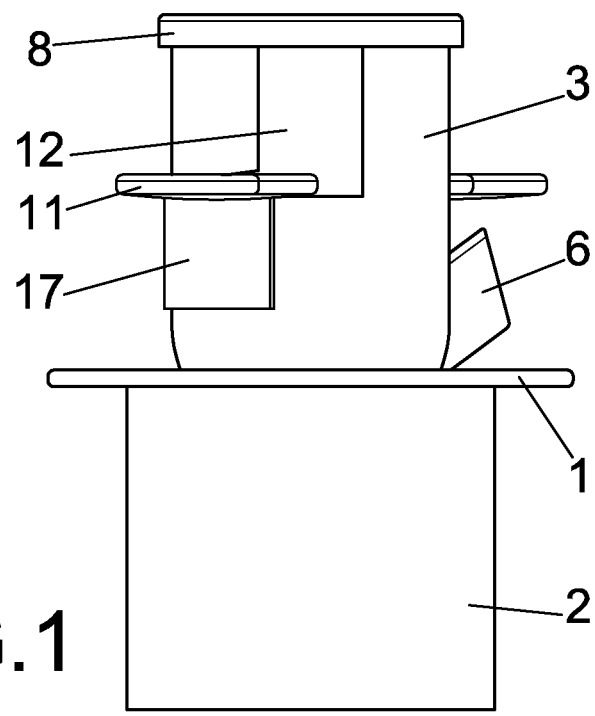
FIG. 1.—Shows a side view of a safety tap for containers for liquids, performed according to the object of the present invention, which appears in open position and with the ribs inserted in the grooves.
Figure 2:
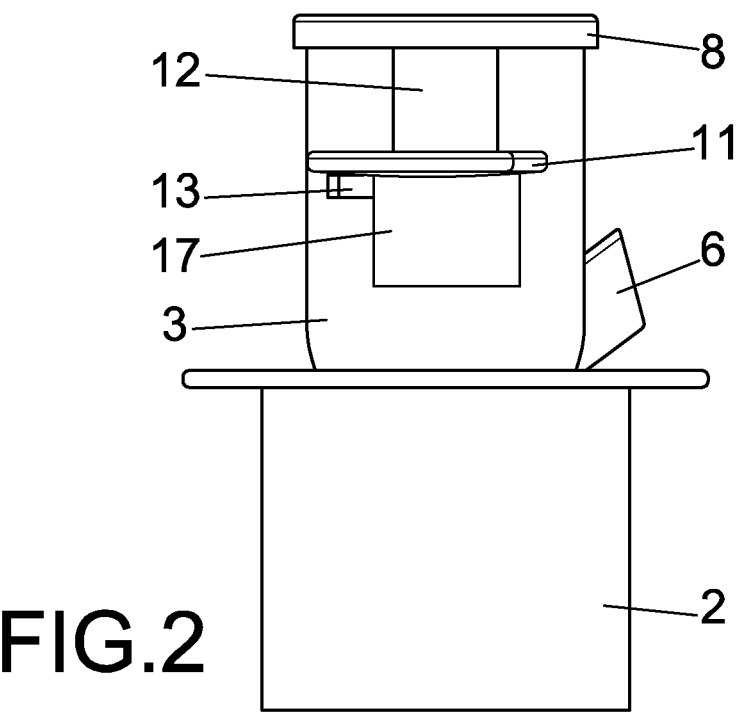
FIG. 2.—Shows another side view of the tap of FIG. 1, wherein in the tap appears in closed position with the ribs outside the grooves.

In light of the indicated figures, it can be observed how the tap claimed consists of a hollow base body which comprises a first end and a second end opposite the first end. In the first end a first cylindrical portion (2) is located designed to constitute a coupling means of the tap to a bushing or neck, not represented in the drawings, conveniently fixed to a bag holding liquid, not represented either. In the second end a second portion (3) is disposed, with an also cylindrical section coaxial with the first portion (2), of smaller diameter, and opposite location to the second portion (3). The base body also comprises an area of confluence where the first portion (2) and the second portion (3) converge.

The base body comprises a sealing seat (4), in the proximity of the first end of the base body; located between the first portion (2) and the second portion (3), particularly in the area of confluence, and equipped with an appreciably spherical configuration, and provided in its polar area with an access orifice (5) to allow the liquid to access from the bag to the tap. The base body further incorporates a pouring spout (6) situated obliquely in the area of confluence between the first portion (2) and the second portion (3), to allow the liquid which has accessed said tap through the access orifice (5) to exit the tap.

The tap has a cap (8) fixed on the second end of the base body. The cap (8) comprises a first end to cover the base body, in particular to cover the second portion (3), and the cap (8) extends through the interior of the second portion (3) of the base body towards a second end.

Additionally, it has windows (12) made in the base body, particularly in the second portion (3). It further incorporates a deformable elastic element (9), connected to the interior of the base body, in particular, of the second portion (3) and, even more particularly, in contact with the second end of the cap (8).

The tap additionally incorporates a bushing (7) of cylindrical, irregular and rigid configuration, which is internally adapted to the cap (8) and to the windows (12) of the base body, where the cap (8) constitutes a support for the thumb of a user's hand.

The bushing (7) comprises at a first end radial ribs (11) located in diametrically opposite situation, which protrude from the base body through the windows (12) and which can be actuated, to allow the user to displace the bushing (7), distancing the bushing (7) from the sealing seat (4), from a closed position, wherein the liquid does not have access to the pouring spout (6), until an open position wherein the liquid has access to the pouring spout (6). The bushing (7) axially extends to a second end wherein a plug (10) is found which is connected to the elastic element (9).

In the embodiment shown in the figures, the pouring spout (6) is located in the area of confluence so that in closed position the elastic element (9) not only plugs the access orifice (5), but also the pouring spout (6), avoiding the presence of liquid in the second portion (3) of the base body in closed position.

Figure 9:
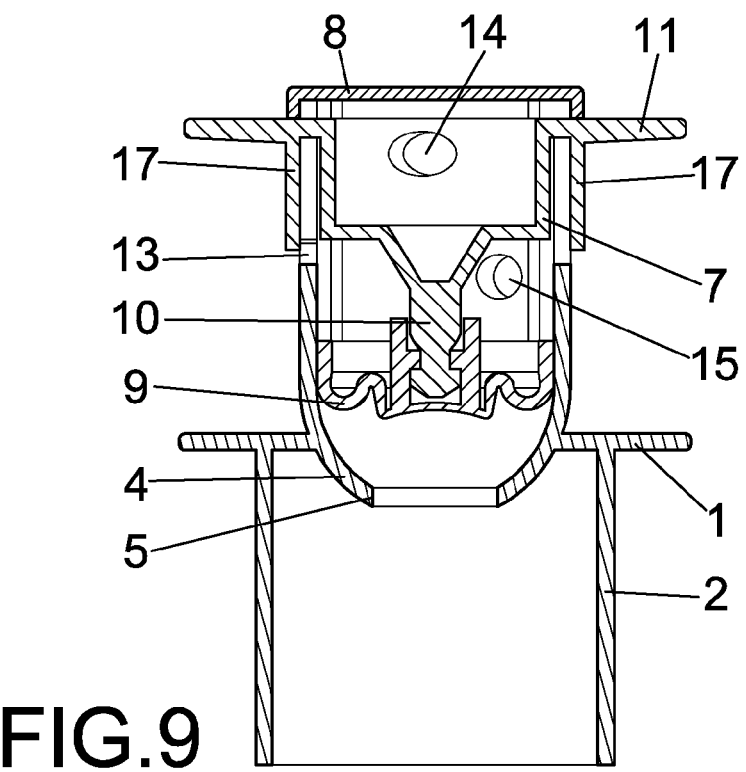
FIG. 9.—Shows an axial longitudinal section of the tap by a plane which traverses the ribs, in open position.

When, starting from of the closed position, the user displaces the bushing (7) using the index and ring fingers while he rests on the cap (8) with the thumb, the elastic element (9), resting on the second end of the cap (8), contracts due to its deformable nature, releasing the pouring spout (6) and the access orifice (5) and producing a communication between one another, obtaining the opening position represented, for example, in FIG. 9.

Figure 3:
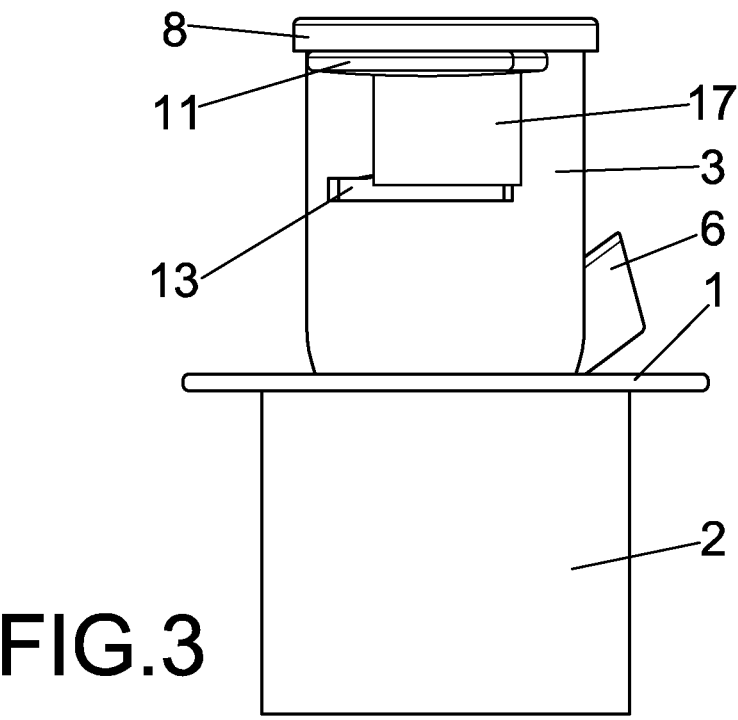
FIG. 3.—Shows another side view of the tap of FIGS. 1 and 2, where the tap appears in open position, i.e. in pouring position.
Figure 4:
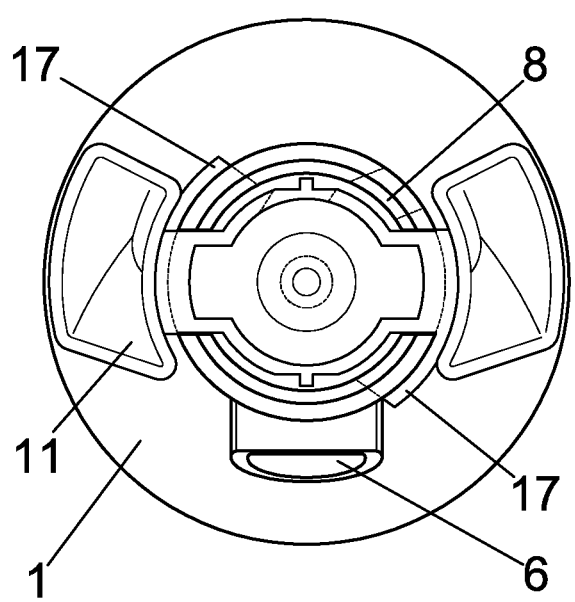
FIG. 4.—Shows a front view of the tap in open position.
Figure 5:
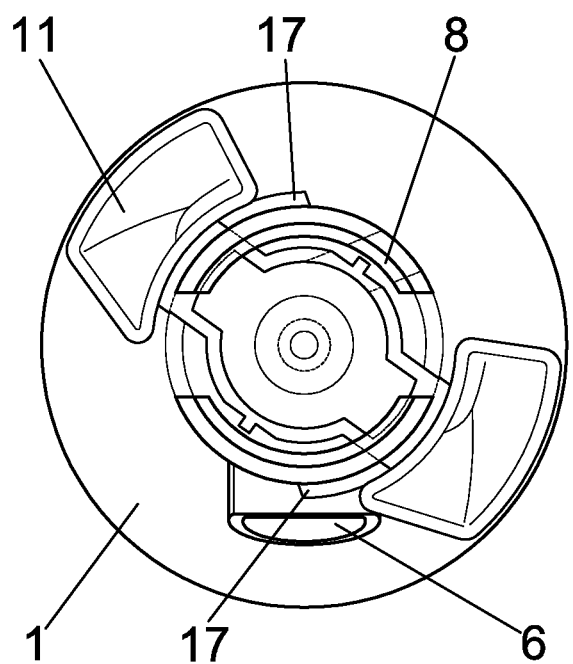
FIG. 5.—Shows a front view of the tap in closed position with the ribs inserted in the grooves.
Figure 6:
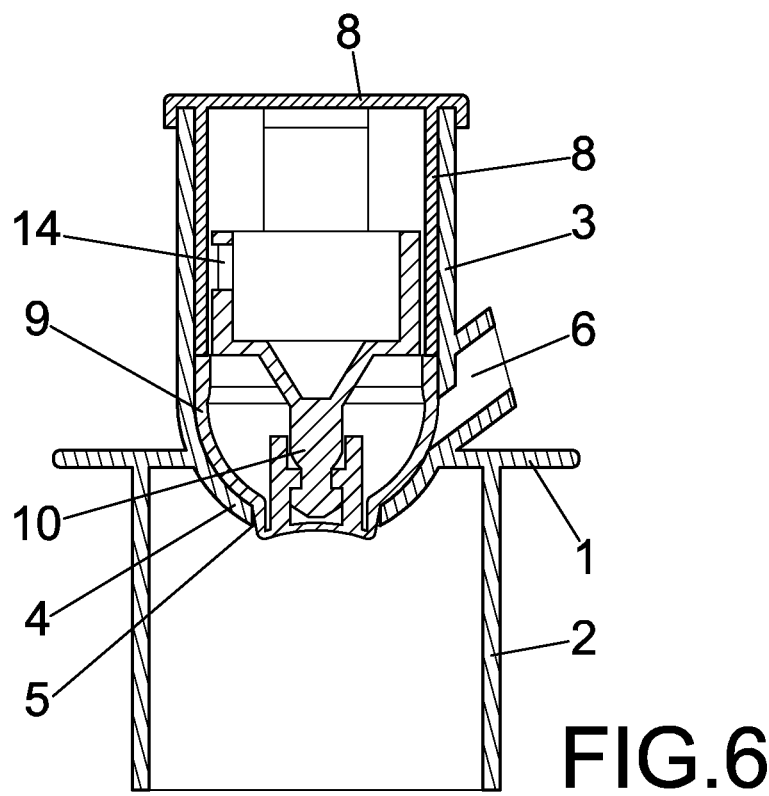
FIG. 6.—Shows an axial longitudinal section of the tap, by a plane normal to the ribs, in the closed position with the ribs outside the grooves.

As observed in FIG. 3, the windows (12) extend in respective safety grooves (13), located at one end of the windows (12) further from the sealing seat (4). In closed position, the grooves (13) allow a partial rotation of the bushing (7) with respect to the base body, a rotation which achieves that the ribs (11) penetrate in the grooves (13), as observed in FIG. 1, with a wedging effect which makes the plug (10) press the deformable elastic part (9) strongly against the sealing seat (4), and the plug (10) deforms the section of the elastic element (9) which plugs the access orifice (5), passing from its semi-spherical to flat configuration, producing a radial increase which guarantees a total water-tightness, both for the liquid content and for the air and gas in opposite direction.

Thus, in this closed situation, the pressure is maximum, and consequently the rotation manoeuvre in opposite direction, i.e. towards the easy opening, without increase in the physical effort of opening, initially requires the complementary act of rotation that hinders the more or less accidental opening of the tap.

Figure 7:
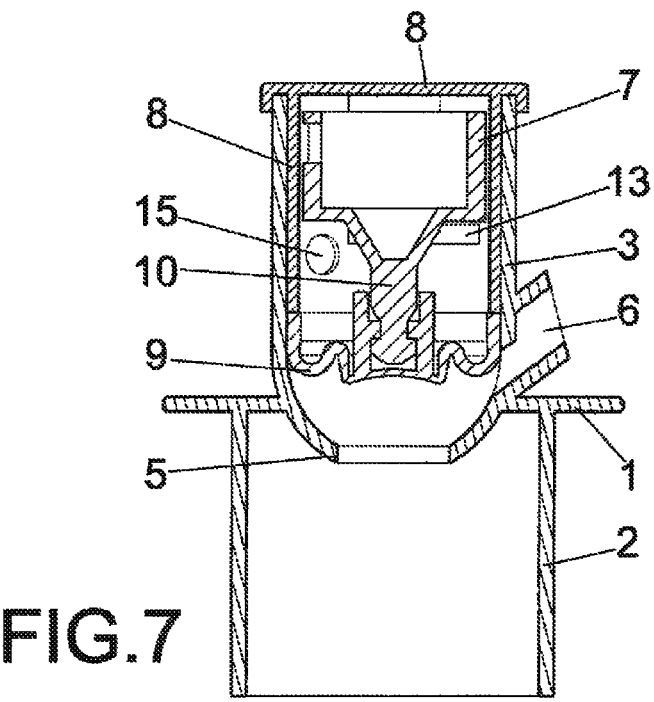
FIG. 7.—Shows an axial longitudinal section of the tap, by a plane normal to the ribs, in open position.
Figure 8:
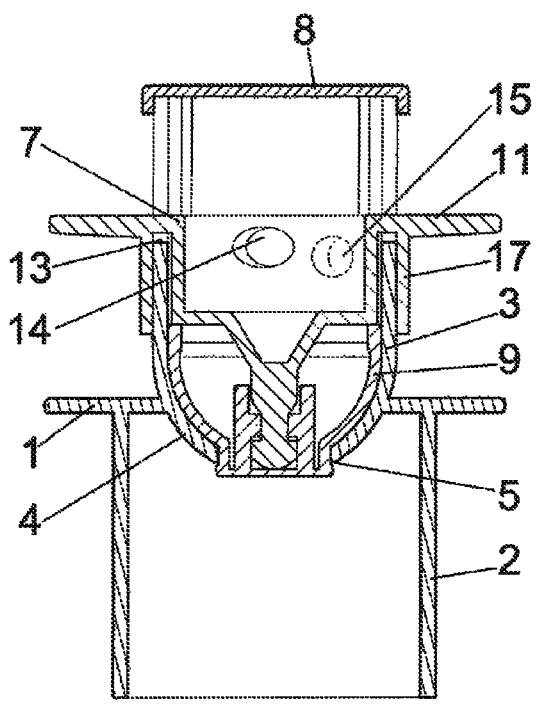
FIG. 8.—Shows an axial longitudinal section of the tap by a plane which traverses the ribs, in closed position with the ribs housed in the grooves.

The cylindrical bushing (7) incorporates a first safety orifice (14) in a diametric position, particularly visible in FIGS. 7 and 8, which in a closed situation for the tap coincides with a second safety orifice (15) of the second portion (3) of the base body, where the first (14) and the second (15) safety orifices coincide in closed position in a situation close to the ribs in the support (10).

Figure 10:
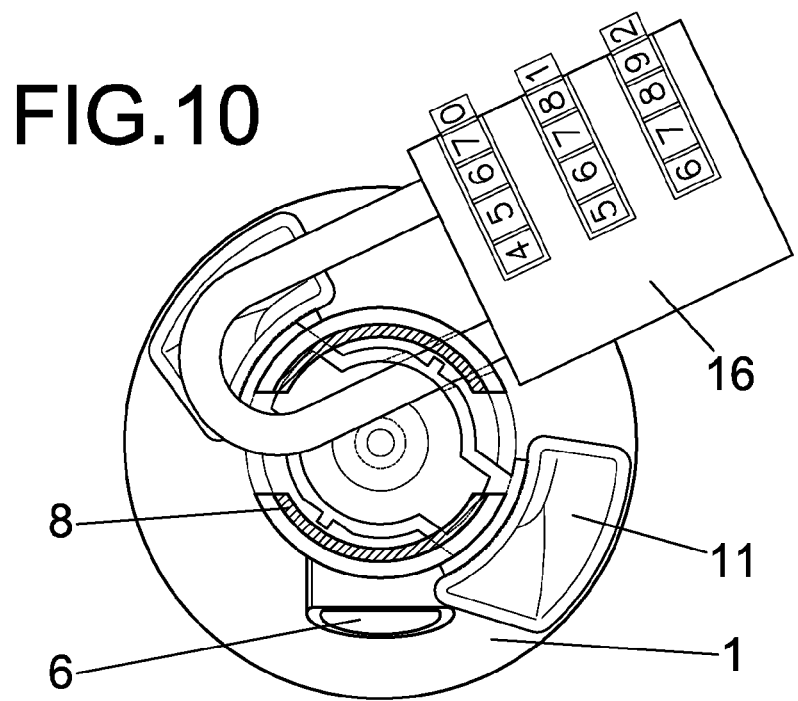
FIG. 10.—Shows a front view of the tap in closed position with the ribs inserted in the grooves and with a padlock mounted which makes the container content inaccessible for any unauthorized user.

In the preferred embodiment described in the figures, the cap (8) incorporates a third safety orifice (not represented), in correspondence with the first (14) and the second (15) safety orifices. The safety orifices (14, 15) have the specific purpose of allowing the implantation of a padlock (16), as shown in FIG. 10, which acts as immobilizer, securely preventing the opening of the tap.

It should finally be indicated that the ribs (11) are provided with respective flaps (17), which extend axially and externally from the ribs (11), and which cover the windows (12) during displacement of the bushing (7) towards the opening position until concealing the windows (12) avoiding that nips may occur in the user's fingers when the tap automatically recovers the closed position.

The invention claimed is:

1. Safety tap for containers for liquids which are sensitive to certain gases and environments, the container having a plastic bag to hold the liquid, and a stabilizing box of cardboard or similar, to house the bag, where the safety tap comprises:
    a hollow base body, equipped with a first end, for being coupled to the bag, and a second end;
    a sealing seat, incorporated in the base body, in the proximity of the first end of the base body;
    an access orifice located in the sealing seat so as to allow the liquid to access from the bag to the tap;
    a pouring spout so as to allow the liquid which has accessed the tap through the access orifice to exit the tap;
    windows made in the base body;
    a bushing displaceable through the interior of the base body;
    ribs, located at a first end of the bushing and protruding from the base body through the windows, and which can be actuated, to allow a user to displace the bushing, distancing the bushing from the sealing seat, from a safety lock position, wherein the liquid does not have access to the pouring spout, until an open position wherein the liquid has access to the pouring spout;
    a deformable elastic element linked to the base body; and
    a plug located at a second end of the bushing, opposite the first end of the bushing, and linked to the elastic element;
    wherein, in the closed position, the elastic element is pressed by the effect of the plug against the sealing seat to close the pouring spout, and in the closed position, the elastic element is configured to exert a recovering force on the bushing;
    the tap further comprising grooves in the base body, in extension of the windows, to house the ribs in the closed position by axial rotation of the ribs and to block the axial displacement of the bushing, maintaining the closed safety position.

2. The tap of claim 1, wherein the base body further comprises:
    a first portion for connecting with the bag;
    a second portion for housing the bushing and the elastic element; and
    an area of confluence of the first portion and the second portion;
    wherein the sealing seat is located in the area of confluence, and the sealing seat and the elastic element have corresponding spherical forms, with the access orifice being located in a polar position of the sealing seat, and the pouring spout is located in the area of confluence so that in closed position the elastic element also plugs the pouring spout, to increase the water-tightness in the closed position.

3. The tap of claim 1, wherein the plug is fitted in the elastic element so that, in the closed safety position, the elastic element is radially expanded in the interior of the access orifice, by means of the pressure exerted by the plug on the elastic element.

4. The tap of claim 1, wherein the ribs extend, axially and externally, in corresponding flaps for covering the windows during the displacement of the bushing towards the open position.

5. The tap of claim 1, further comprising:
a first safety orifice located in the bushing; and
a second safety orifice, located in the base body, in correspondence with the first safety orifice, so as to allow the passage of a padlock through the safety orifices in the closed safety position, to prevent the axial rotation of the bushing, avoiding an unauthorized opening of the tap.

6. The tap of claim 5, further comprising:
a cap fixed in the second end of the base body, wherein the cap internally extends through the base body, and the cap comprises a first end to cover the second end of the base body, wherein the cap extends towards a second end which contacts with the elastic element; and
a third safety orifice made in the cap to allow the passage of the padlock, in correspondence with the first and the second safety orifices.

7. The tap of claim 1, further comprising a cap fixed in the second end of the base body, wherein the cap internally extends through the base body, and the cap incorporates a first end to cover the second end of the base body, wherein the cap extends towards a second end which contacts with the elastic element.

8. The tap of claim 1, wherein the grooves are configured to exert in the closed safety position a wedging pressure on the ribs towards the sealing seat.

* * * * *